United States Patent [19]
Barron et al.

[11] 3,792,996
[45] Feb. 19, 1974

[54] HERBICIDAL COMPOSITION
[75] Inventors: Joseph E. Barron, Shelton; Adam Soboleski, Naugatuck, both of Conn.; William S. McIntire, Senatobia, Miss.
[73] Assignee: Uniroyal, Inc., New York, N.Y.
[22] Filed: May 7, 1971
[21] Appl. No.: 141,388

[52] U.S. Cl.................... 71/115, 71/122, 71/DIG. 1
[51] Int. Cl............................................... A01n 9/20
[58] Field of Search.................. 71/115, 122, DIG. 1

[56] References Cited
UNITED STATES PATENTS
2,971,013  2/1961  Entemann...................... 260/395 X
3,108,927  10/1963  Pyne..................................... 167/31

OTHER PUBLICATIONS
Maksimov et al. Chem. Abst. Vol. 62 (1965) 1021c
Zinsmeister et al. Chem. Abst. Vol. 6 (1965) 7043c

*Primary Examiner*—Lewis Gotts
*Assistant Examiner*—Catherine L. Mills
*Attorney, Agent, or Firm*—Bert J. Lewen, Esq.

[57]  ABSTRACT

An N-arylphthalamate-dinitroalkyl phenolate herbicidal formulation is made stable in hard water by the addition of 2 to 20 percent by weight of a water soluble phenolic material.

5 Claims, No Drawings

HERBICIDAL COMPOSITION

This invention relates to a new herbicidal composition which is particularly stable in the presence of hard water. More specifically, the invention relates to a herbicidal formulation containing an admixture of two herbicidally active materials, namely, salts of N-aryl phthalamic acid and dinitroalkylphenol, in admixture with a water-soluble phenolic, a surfactant, cyclohexanone and water.

The aforesaid herbicidally active materials have been described in the patent literature. See U.S. Patents 2,556,665 and 2,392,856. N-1-naphthylphathalamic acid and 4,6-dinitro-o-sec. butylphenol are sold in combination and marketed under the name Dyanap (trademark of Uniroyal, Inc.). While Dyanap has achieved considerable commercial success, it however, has been found unstable when blended with water of an elevated hardness level.

It has now been discovered that this deficiency can be overcome by using the salts of both herbicides with a water soluble phenolic material, cyclohexanone and water.

The Table sets forth the weight percent of the components in the formulations of the invention:

TABLE

| Component | Broad | Preferred |
| --- | --- | --- |
| N-arylphthalamate | 1–36 | 10–30 |
| Dinitroalkyl phenolate | 1–30 | 5–25 |
| Phenolic material | 1–20 | 2–15 |
| Surfactant | 0–10 | 0.1–1 |
| Cyclohexanone | 1–16 | 7–14 |
| Water | 20–92 | 30–75 |

The N-aryl phthalamic acid salts have the following formula:

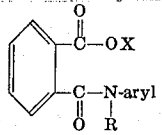

where R is hydrogen, or an alkyl radical, e.g., methyl, ethyl, n-propyl, isopropyl, n-butyl, isobutyl, secbutyl, amyl, hexyl, octyl. The aryl group may be a phenyl or naphthyl group, which may be substituted, as haloaryl, nitroaryl, alkylaryl, or hydroxyaryl, e.g., o-chlorophenyl, m-chlorophenyl, p-chlorophenyl, 2,4-dichlorophenyl, 2,5-dichlorophenyl, 2,4,5-trichlorophenyl, 2-methyl-4-chlorophenyl, 2-bromophenyl, 4-bromophenyl, 2,4,5-tribromophenyl, o-nitrophenyl, m-nitrophenyl, p-nitrophenyl, 2-methyl-4-nitrophenyl, 2-chloro-4-nitro-phenyl, o-hydroxyphenyl, m-hydroxyphenyl, p-hydroxyphenyl, 2-chloro-4-hydroxyphenyl, o-tolyl, m-tolyl, p-tolyl, p-tolyl, alpha-napththyl, beta-naphthyl. The X may be an alkali metal, ammonium and amine, e.g., sodium, potassium, ammonium, methyl ammonium, dimethyl ammonium, trimethyl ammonium, ethyl ammonium, ethanol ammonium, diethanol ammonium, or triethanol ammonium.

The 4,6-dinitro-o-alkylphenol salts which was used may be represented by the following formula:

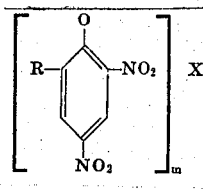

wherein R is an alkyl radical containing from 3 to 10 carbon atoms, X is a alkali metal ion, and $m$ is the valance of said ion.

Examples of these compounds are sodium 4,6-dinitro-o-normal-propyl-phenolate, sodium 4,6-dinitro-o-normal-amyl-phenolate, sodium 4,6-dinitro-o-isobutyl-phenolate, potassium 4,6-dinitro-o-tertiarybutyl-phenolate, ammonium 4,6-dinitro-o-isoamyl-phenolate. Others include sodium 4,6-dinitro-o-normal-butyl-phenolate, sodium 4,6-dinitro-o-tertiary-octyl-phenolate, and potassium 4,6-dinitro-o-normal-hexyl-phenolate.

The water soluble phenolic materials may be phenol or hydroxyl, lower alkyl or a carboxyl substituted derivative thereof wherein such derivative contains one to four additional substitutions on the ring. Preferably the substitutions are 1 or 2 additional hydroxyl groups and/or one lower alkyl or carboxyl group. Examples of the phenolic materials are phenol, resorcinol, catechol, hydroxyquinone, phloroglucinol, cresol and gallic acid.

Preferably a surfactant is used though the particular one is not critical. Preferred examples include the anionic-type such as tetrasodium ethylenediaminetetraacetate dihydrate and octylphenoxy poly (ethyleneoxy) ethanol.

Examples of other anionic surface-active agents are: soaps (e.g., sodium laurate, ammonium stearate, diethanol ammonium oleate), alkylsulfonates (e.g., dodecyl sodium-sulfonate, cetyl potassium sulfonate), alkylsulfates (e.g., sodium dodecylsulfate, sodium oleyl sulfate), sulfonated ethers of long and short chain aliphatic groups (e.g., $C_{17}H_{33}$—O—$C_2H_4SO_3Na$), sulfated ethers of long and short chain aliphatic groups (e.g., $C_{17}H_{33}$—O—$C_2H_4O$-$SO_3Na$), sulfonated alkyl esters of long chain fatty acids

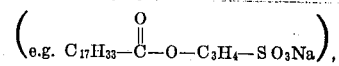

sulfonated glycol esters of long chain fatty acids

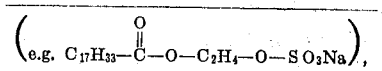

sulfonated alkyl substituted amides of long chain fatty acids

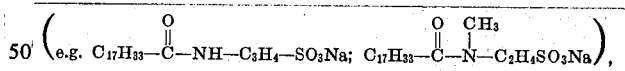

alkylated arylsulfonates (e.g., tetrahydronaphthalene sodium sulfonate, dodecyl benzene sodium sulfonate), hydroaromatic sulfonates (e.g., tetrahydronaphthalene sodium sulfonate), alkylsulfosuccinates (e.g., dioctyl sodium sulfosuccinate), and aryl sulfonate-formaldehyde condensation product (e.g., condensation product of formaldehyde and sodium naphthalene sulfonate).

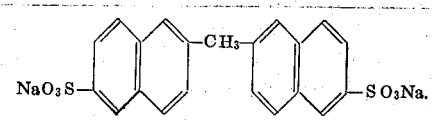

Usually the sodium salts are more effective than comparable potassium salts.

Non-ionic surface-active agents that may be used in the present growth regulant compositions are: polyether alcohols, such as reaction products of ethyleneoxide or polyethyleneglycol with a long chain fatty alcohol (e.g., reaction product of ethylene oxide and oleyl alcohol, viz: $C_{17}H_{33}-(OC_2H_4)_nOH$ where $n$ is 10 to 20; polyglycol esters, such as reaction products of ethylene oxide or polyethylene glycol with a long chain fatty acid (e.g. reaction product of ethylene oxide or polyethylene glycol with oleic acid, viz:

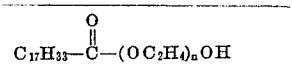

where $n$ is 10 to 20; and partial esters of polyhydric alcohols with long chain fatty acids (e.g., diethyleneglycol monolaurate, sorbitan trioleate).

Cationic surface-active agents that may be used in the present growth regulant compositions are: quaternary ammonium salts in which one of the groups attached to the nitrogen has an aliphatic group having at least 8 carbon atoms (e.g., trimethylcetyl ammoniumiodide, laurylpyridinium chloride, cetyldimethylbenzyl ammonium-chloride, N-stearylbetaine); and amines, amides, diamines and glyoxalidines having an aliphatic group containing at least 8 carbon atoms and their acid esters (e.g., stearyl amine hydrochloride, oleylamide, diethylethyleneoleyldiamine, 2-heptadecyl-N-hydroxyethylglyoxalidine).

As an example, the following procedure may be used to prepare the formulations of the invention:

1. Dissolve the sodium salt of N-1-naphthylphthalamic acid in water to give 1 to 2 pounds active ingredient per gallon in the final product.

2. Dissolve sodium hydroxide in this solution in the amount that will insure complete conversion of 4,6-dinitro-o-sec-butylphenol to the corresponding sodium salt.

3. Load the cyclohexanone to 8–10 percent by weight of total composition.

4. Load the 4,6-dinitro-o-sec-butylphenol which will give 1 to 2 pounds active ingredient per gallon in the final product.

5. Load the phenol, 2 to 10 percent by weight of total composition, Sequestrene ST (tetra sodium ethylenediaminetetraacetate dihydrate) and Igepal CA630 (octylphenoxypoly [ethyleneoxy] ethanol) and water.

6. Blend and package.

Dilution prior to application may be accomplished in any suitable vessel, preferably while agitating, by addition of the formulation to water usually at a ratio of one gallon of the formulation per 2 to 40 gallons of water.

For air applications, the preferred ratio is about one gallon of formulation per 4 to 6 gallons of water; ground applications usually call for a ratio of one gallon per 25 to 35 gallons of water. However, if so desired the formulation of the invention may be used without further dilution.

The application rate usually varies between 3 to 9 pounds of total active ingredients per acre, but lower or higher rates may be used depending on local (soil, climate or crop) conditions. The optimum amount may be readily determined by those skilled in the art. The composition may be applied by ultra low volume techniques for highly concentrated solutions or by the generally used spray methods (air or ground) for less concentrated formulations.

EXAMPLE 1

This example compares the hard water stability of the formulation of the instant invention to the standard Dyanap formulation. The composition of the formulations are as follows:

TABLE A

| Material of Invention | Gram Parts/100 ml |
|---|---|
| N-1-naphthyl dichloro phthalamic acid | 24.0 |
| Sodium hydroxide (98.3%) | 5.8 |
| 97% 4,6-dinitro-0-sec-butyl-phenol (3% impurities) | 12.4 |
| Catechol | 3.0 |
| Cyclohexanone | 10.0 |
| Water to 100 ml | 59.8 |
| | 115.0 |

| Standard Dyanap | Gram Parts/100 ml |
|---|---|
| 31.95% Sodium N-1-naphthylphthalamate in water | 80.20 |

TABLE A—Continued

| Material of Invention | Gram Parts/100 ml |
|---|---|
| 97% 4,6-dinitro-o-sec-butylphenol (3% impurities) | 12.37 |
| 40% Cheelox NTA-14 (40% aq. sol. of nitrilotriacetic acid trisodium salt) | 5.70 |
| 50% Caustic (Sodium Hydroxide) | 4.06 |
| Cyclohexanone | 10.04 |
| Igepal CA-630 | 0.24 |
| Sequestrene ST | 0.04 |
| Water to 100 ml | 1.35 |
| | 114.00 |

Using synthetic "hard water" prepared from calcium chloride and magnesium sulfate, a 2000 ppm stock solution is prepared. By proper dilutions with distilled water various test waters are obtained. To prepare the test solutions, 94 ml of the various "hard waters" are placed in a cylinder graduate. To this, 6 ml of the herbicide concentrate is added. The graduate is stoppered and inverted several times to insure complete mixing. They are observed after 30 minutes of standing and evaluated for the degree of clarity. It has been found that within 30 minutes usually all the precipitates will have formed with minimal settling thereof. The following results were obtained:

TABLE B

| Total water hardness (ppm) | 0 | 300 | 500 | 1000 |
|---|---|---|---|---|
| Formulation of invention | clear | clear | Sl. hazy | hazy |
| Dyanap | clear | clear | opaque | opaque-ppt. |

Clearly, the formulation of the invention has superior hard water stability.

EXAMPLE 2

The "hard water" stability of the formulation of the instant invention verses Daynap in actual water samples obtained from the field is shown in this example. Gallon samples of "hard water" were obtained and their total hardness determined by the Taylor Total Water Hardness Method. This procedure, described by W. A. Taylor and Company, Baltimore 4, Maryland is as follows:

All equipment should be clean. Measure 50 ml sample and put into 200 ml flask. Hold back 5–10 mls. Add 0.5 mls of hardness buffer to flask, mix. Add one dipper hardness dye indicator powder; mix to dissolve dye. If hardness is present mix should be red. Run in hardness reagent until color changes to blue. Add remaining water. If color turns red, add hardness reagent until end product turns blue. Take burette reading of hardness reagent and multiply by 20 if 50 mls of water is used; by 10 if 100 mls is used.

The following formulation of the invention is used:

TABLE C

| Formulation B | Gram Parts/100 ml |
| --- | --- |
| 94% Sodium N-1-naphthyl-phthalamate* | 27.2 |
| 97% 4,6-dinitro-o-sec-butyl-phenol | 12.4 |
| Sodium hydroxide (95.5% active) | 3.1 |
| Phenol | 3.0 |
| Cyclohexanone 10.0 | |
| Water to 100 ml | 58.8 |
| | 114.5 |

*Contains the Sequestrene ST 0.24%. Igepal CA630 0.04%.

Using the field dilution of 6 ml herbicide to 40 ml of water sample, the following data were observed.

TABLE D

| Test Water | J. Stewart's Airport Cahagen, Rt. 4, La. | L. Bundrick Westdale, La. | C. M. Hutchinson-Gin Shreveport, La. |
| --- | --- | --- | --- |
| Total hardness | 635 ppm | 672 ppm | 794 ppm |
| Formulation B | CLEAR | CLEAR | CLEAR |
| Dyanap | OPAQUE | OPAQUE | OPAQUE |

The hard water stability of instant invention compared to standard Dyanap is obviously superior.

EXAMPLE 3

The object of these data are to illustrate the weed control by using the instant invention vs standard Dyanap. The formulation was prepared in large volume and shown below as Formulation C. To obtain equivalent comparison the active ingredients were in equal proportion as used in Dyanap. One pound 4,6-dinitro-o-sec-butylphenol and two pounds N-1-naphthylphthalamic acid active per gallon.

TABLE E

| Formulation C | Pounds Charge/100 Gallons |
| --- | --- |
| 31.95% aqueous sodium N-1-naphthylphthalamate solution | 667.0 |
| 97%, 4,6-dinitro-o-sec-butyl phenol | 104.0 |
| Cyclohexanone | 83.0 |
| Phenol | 25.0 |
| 50% sodium hydroxide | 34.0 |
| Water to 100 gallons | as needed |

This was packaged in one gallon units and sampled to various locations in the South and mid-West for actual field comparison with standard Dyanap. The results were as follows:

TABLE F

| | Form C | Dyanap |
| --- | --- | --- |
| 1. Runner peanuts P&C Farms, Conalsonville, Ga. Morningglory (*Ipomoea purpurea*) | 100% | 90% |
| Sickle pod (*Cussia obtasifolia*) | 70% | 30% |
| 2. P&C Farms, Jakin, Ga., Spanish peanuts. Control of sickle pod (*cussia obtusifolia*) | 70% | 50% |

SOYBEANS

| | | 6 Quarts/Acre | |
| --- | --- | --- | --- |
| | | Dyanap | Uni-1053 |
| Foxtail Giant (*Setaria Faberii*, Herrm.) | a. | 270 | 290 |
| | b. | 265 | 290 |
| | c. | 267 | 290 |
| Pig Weed (*Amaranthus retroflexus* L.) | a. | 290 | 290 |
| | b. | 260 | 275 |
| | c. | 280 | 286 |
| Cocklebur (*Xanthium pensylvanicum* Wallr.) | a. | 260 | 295 |
| | b. | ND* | ND |
| | c. | 255 | 275 |
| Morningglory (*Ipomoea purpurea* (L), Roth) | a. | 279 | 289 |
| | b. | ND | ND |
| | c. | 260 | 280 |
| Buttonweed (*Abutilon thephrast* Medic) | a. | ND | ND |
| | b. | 250 | 284 |
| | c. | ND | ND |
| Careless Weed (*Amaranthus hybridus* L.) | a. | ND | ND |
| | b. | 255 | 279 |
| | c. | ND | ND |

Ratings: 0 — no weed control; 300 — complete weed control; *ND — No data
Formulation C is superior for Sickle Pod Control.

EXAMPLE 4

The purpose is to demonstrate other ratios of active ingredients which may be prepared; however, equivalent Dyanap formulations at these ratios are not stable and cannot be prepared; therefore, comparative weed control or hard water tests are not possible.

TABLE G

| Materials | 1#/2# Active/Gallon Gram Parts/100ml | 2#/2# Active Gallon Gram Parts/100 ml |
| --- | --- | --- |
| Sodium N-1-naphthyl-phthalamate (88.2% act) | 13.6 | 27.2 |
| 97% 4,6-dinitro-o-sec-butylphenol | 24.7 | 24.7 |
| Sodium hydroxide (98.5%) | 4.3 | 4.3 |
| Catechol | 10.0 | — |
| Resorcinol | — | 11.5 |
| Cyclohexanone | 10.0 | 10.0 |
| Water - to 100 ml | — | — |
| Total Parts | 119.8 | 115.0 |

These data show the winder range of weight ratios possible with regard to the active ingredients of N-arylphthalamates and dinitroalkylphenolates.

Having thus described our invention, what we claim and desire to protect by Letters Patent is:

1. In an improved agricultural formulation which comprises (A) 1 to 36 percent by weight of a compound having the formula:

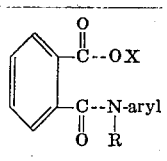

where R is hydrogen or alkyl; aryl is substituted or unsubstituted N-phenyl or N-naphthyl wherein said substitutions are halo, nitro, alkyl or hydroxyl and X is an alkali metal, ammonia or an amine salt; (B) 1 to 30 percent by weight of an alkali metal salt of 4,6-dinitro-o-alkyl phenol, wherein the alkyl group has 3 to 10 carbon atoms; (C) 1 to 16 percent by weight of cyclohexanone; and (D) from 20 to 92 percent by weight of water, the improvement comprising the addition of 2 to 20 percent by weight of a water-soluble phenolic material selected from the group consisting of phenol, resorcinol, catechol, hydroquinone, phloroglucinol, cresol and gallic acid, whereby the formulation is stable in hard water.

2. The agricultural formulation of claim 1 wherein the salts of the N-arylphthalamic acid and the 4,6-dinitro-o-alkylphenol are the sodium salt.

3. The agricultural formulation of claim 1 wherein component (A) is sodium N-1-naphthyldichlorophthalamate and component (B) is sodium 4,6-dinitro-o-sec-butylphenolate.

4. The agricultural formulation of claim 1 wherein the formulation contains a surfactant.

5. The agricultural formulation of claim 1 wherein the amount of (A) is 10 to 30 percent; of (B), 5 to 25 percent; of (C), 7 to 14 percent; of (D), 30 to 75 percent; and of the water-soluble phenolic material, 2 to 15 percent.

* * * * *